May 9, 1933.  F. BUSHMAN  1,907,510
SLACK ADJUSTER
Filed April 27, 1931
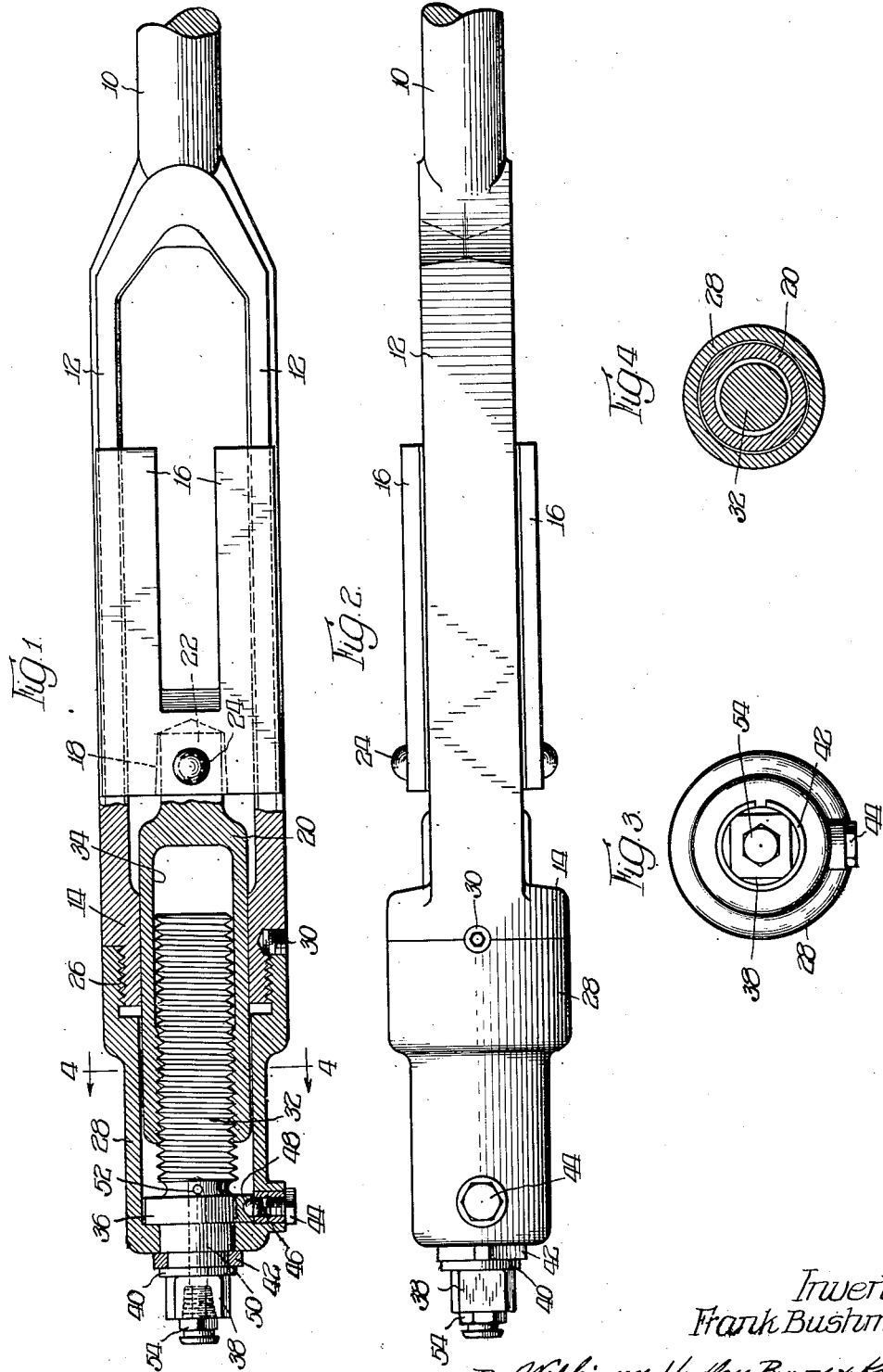
Inventor:
Frank Bushman,
By Wilkinson, Huxley, Byron & Knight
Attys.

Patented May 9, 1933

1,907,510

UNITED STATES PATENT OFFICE

FRANK BUSHMAN, OF CHICAGO, ILLINOIS, ASSIGNOR TO AMERICAN STEEL FOUNDRIES, OF CHICAGO, ILLINOIS, A CORPORATION OF NEW JERSEY

SLACK ADJUSTER

Application filed April 27, 1931. Serial No. 533,026.

This invention relates to improvements in slack adjusters employed for the purpose of taking up slack in railway brake rigging.

An object of the invention is to provide an improved slack adjuster having novel means for adjusting the relative position of the fulcrum of the truck lever with which the same is associated.

A further object is to provide a manually operated screw mechanism for taking up slack in railway brake rigging having a construction which will permit operation of the screw portion for adjustment purposes, preventing, however, inadvertent movement through frictional holding means, and which in addition will afford increased protection against corrosion of the operating parts.

A yet further object is to provide a slack adjuster of the type described having a separable housing with means for locking the same in assembled position, which will facilitate protection and yet fulfill all requirements for efficient operation.

A further object is to provide a slack adjuster with a rotatably mounted operating screw adapted to impart, by reason of its rotation, longitudinal movement to an adjusting nut, the mechanism being provided with means for lubricating the parts.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a plan view, parts being shown in section, of the slack adjuster constructed in accordance with the present invention.

Figure 2 is a side elevational view of the same.

Figure 3 is an end view of the device shown in Figure 1, and

Figure 4 is a sectional view taken on the line 4—4 of Figure 1.

Referring to the drawing, the embodiment of the device selected for illustration comprises a tie rod 10 having a frame providing spaced arms 12 which are joined at the end opposite the tie rod by a hub portion 14. The fulcrum block 16 is adapted to have slidable movement upon the arms 12 and is provided with a centrally disposed socket 18. One of the truck levers of the brake rigging is adapted to have pivotal connection with the fulcrum block 16 and it is thus seen that movement of the block on the arms 12 will function to vary the position of the fulcrum of the truck lever with relation to the tie rod 10.

For effecting movement of the fulcrum block 16 an adjusting nut 20 is provided having an inwardly projecting end 22 fitting into the socket 18 formed in the fulcrum block, and by means of the rivet pin 24 the block and nut are pivotally secured together. The hub portion 14 is provided with a longitudinal central bore in which the adjusting nut 20 is mounted for slidable movement. The hub portion 14 is also provided with a threaded end 26 to which is threaded a tubular member 28 forming a housing for the projecting end of the adjusting screw 20. By means of the set screw 30 the housing 28 is locked in assembled position on the frame formed on the tie rod 10.

Suitably mounted in the end wall of the housing 28 is an elongated screw 32 forming a slack adjusting screw, which is threaded to the adjusting nut 20 by means of the threads provided in the central bore 34 formed in the same. The screw 32 is provided with a collar 36 positioned within the housing 28 and having engagement with the end wall of the same and an exterior portion 38 which is squared as shown, providing means for rotating the screw. In assembling the parts the screw 32 is inserted in the opening in the end wall of the housing 28 until the collar 36 abuts the interior surface of the same. By means of a smaller collar 40 formed on the screw adjacent the squared portion, a washer 42 is held in position and the construction functions to mount the screw rotatably in the housing 28, preventing, however, any longitudinal movement of the same. The washer 42 is made in the form of a strip, which is then bent into U-shape and inserted between the housing 28 and the collar 40. The ends of the strip are then bent toward each other locking the washer in place.

For holding the adjusting screw 32 in any adjusted position the housing 28 is provided with a screw 44, the same having engagement with a coil spring 46 for resiliently urging a detent 48 into a recess provided in the collar 36. The detent serves to hold the screw 32 against accidental or inadvertent rotation but permits positive rotation of the same when the screw is actuated by means of the squared portion 38.

In operation of the slack adjuster the tie rod 10 may comprise any tie rod of the brake rigging having connection to the truck levers, and connection to the same in this case is effected by pivotally joining the truck lever to the fulcrum block 16. Movement of the fulcrum block therefore upon the arms 12 will function to vary the relative position which the lever will assume in relation to the tie rod. For adjusting the position of the block it is only necessary to cause rotation of the screw 32 which will function to cause longitudinal movement of the nut 20 through the threaded engagement the nut has with the screw. In order that the screw 32 may be readily turned when desired its projecting end is provided with flat surfaces 38 forming means whereby the same can be readily gripped by any suitable tool. Since the screw 32 is adapted to have rotation in the housing and rotation with respect to the nut 20, the housing is supplied with a lubricant by means of the duct or passage 50 formed in the end of the screw and which communicates with a right angle duct 52 opening in the housing. The passage 50 is normally closed by means of an alemite fitting 54. By means of the lubricating structure the operating parts are readily supplied with any suitable lubricating medium and are also afforded increased protection against corrosion.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake slack adjuster, the combination of a slotted frame providing spaced arms, a fulcrum block slidably mounted on said arms, said frame terminating in a hub portion having a bore extending therethrough, a nut slidably mounted in said bore and secured to the block, and means for adjusting the position of said nut.

2. In a brake slack adjuster, the combination of a slotted frame, a hub portion formed at one end of said frame, a fulcrum block movable on said frame, a nut positioned in an opening in the hub portion and secured to the block, and a screw threaded in said nut and rotatable in the frame.

3. In a brake slack adjuster, the combination of a frame having an opening in one end thereof, a fulcrum block slidably mounted in the frame, a nut mounted for slidable movement in said opening and secured to the block, a housing detachably secured to the frame, a slack adjusting screw mounted for rotation in said housing, said screw being threaded in said nut for adjusting the fulcrum block.

4. In a brake slack adjuster, the combination of a frame, one end wall of said frame forming a hub portion, said hub having an opening with threads provided on the exterior of said portion, a fulcrum block slidable on said frame, a nut secured thereto and positioned in said opening, a housing threaded to the hub portion, and a screw having association with said nut and rotatably mounted in said housing.

5. In a brake slack adjuster, the combination of a frame, one end wall of said frame forming a hub portion, said hub having an opening with threads provided on the exterior of said portion, a fulcrum block slidable on said frame, a nut secured thereto and positioned in said opening, a housing threaded to the hub portion, and a screw having association with said nut and rotatably mounted in said housing, a portion of said screw projecting through and beyond said housing for actuating the same.

6. In a brake slack adjuster, the combination of a frame, one end wall of said frame providing a hub portion, a tubular member threaded to said portion, a fulcrum block slidably mounted on said frame, a nut slidably mounted in said hub portion and extending into said tubular member, a screw rotatably mounted in the end wall of said member and having operative association with said nut, and a portion of said screw extending beyond said member for actuating the same.

7. In a brake slack adjuster, the combination of a frame, one end wall of said frame providing a hub portion, a housing threaded to said portion, a fulcrum block slidably mounted on said frame, a nut slidably mounted in said hub portion and secured to the block, a screw rotatably mounted in the end wall of said housing and threaded into said nut, a portion of said screw extending outwardly of the housing for permitting actuation of the screw, and means for supplying the interior of the housing with a lubricant.

Signed at Hammond, Indiana, this 23rd day of April, 1931.

FRANK BUSHMAN.